United States Patent Office 3,302,395
Patented Feb. 7, 1967

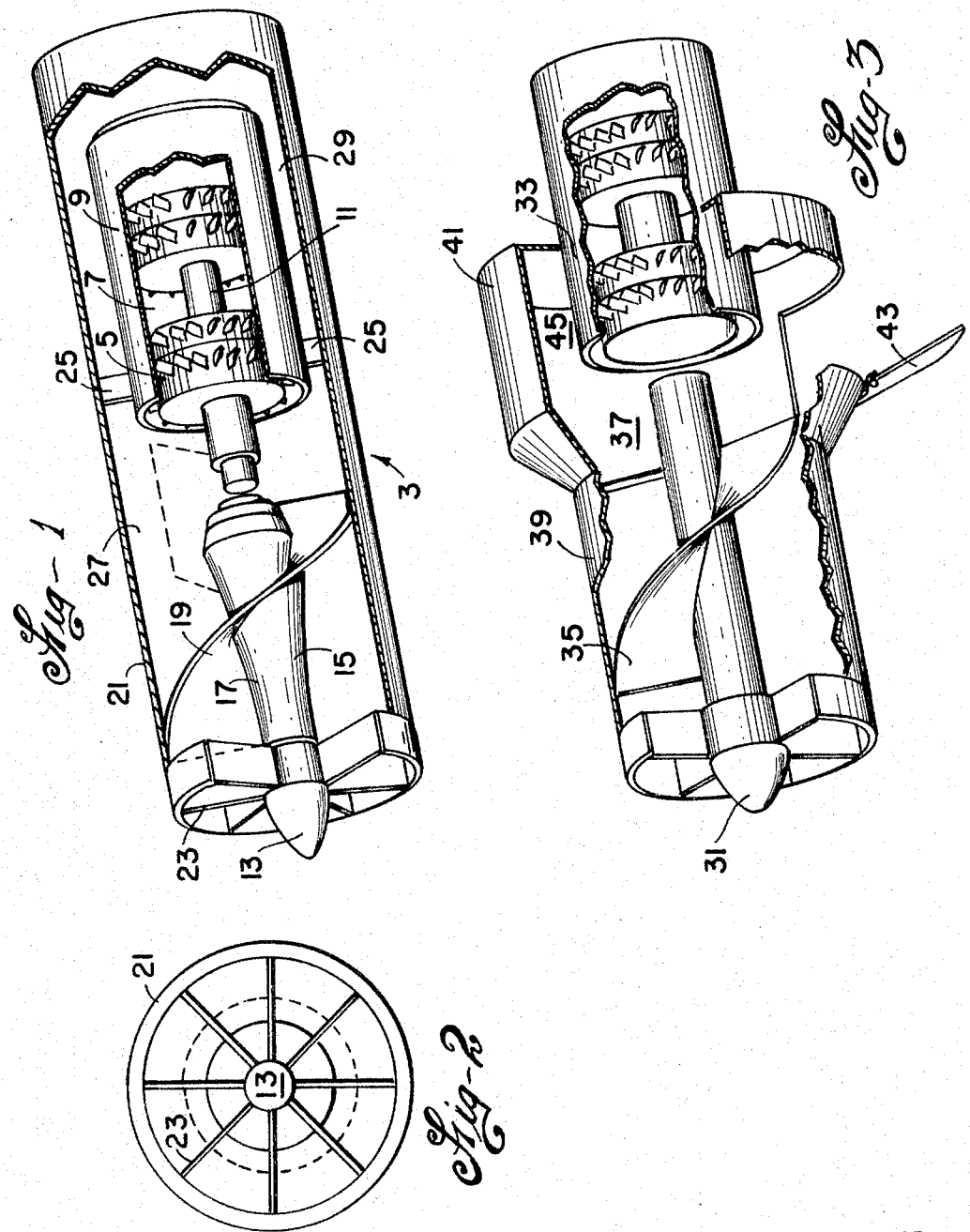

3,302,395
DEBRIS SEPARATOR FOR AIRCRAFT GAS
TURBINE ENGINES
Louis Robbins, 116 David Road, Cynwyd, Pa. 19004
Filed July 8, 1965, Ser. No. 470,641
6 Claims. (Cl. 60—39.09)

The invention described herein may be manufactured and used by or for the Government of the United States of America for governmental purposes without the payment of any royalties thereon or therefor.

The present invention relates to novel and improved axial flow gas turbine engines and more particularly to novel and improved apparatus for preventing entry of foreign objects into the interior of axial flow gas turbine engines.

Aircraft turbine engines are particularly susceptible to damage from foreign objects introduced into the air intake stream of the gas turbine. Stones, gravel and other foreign matter drawn into the air stream often rupture, distort and damage blades and other component parts of the compressor of the engine. When this occurs, the desired balanced condition of the compressor is often disrupted and the probable useful life of the engine is shortened if it is not completely destroyed. Aircraft turbine engines have therefore been commonly provided heretofore with air inlet screens and the like to prevent ingestion of sizable foreign objects. Inlet screens of this kind, however, have been found to produce a safety hazard when ice forms over the screen. They also generally impair the efficiency of the engine by interfering with normal air flow through the engine and frequently these screens break up with disastrous results to the engine.

It is therefore a principal object of the present invention to provide novel and improved apparatus for preventing the ingestion of undesirable foreign objects in a gas turbine engine without impairing its efficiency or safe operation.

It is a further object of the present invention to provide novel and improved apparatus for preventing the ingestion of undesirable foreign objects in an axial flow gas turbine engine without the use of conventional screening devices.

It is a further object of the present invention to provide novel and improved apparatus which imparts a centrifugal field of flow to the induction air as it enters the compressor of a gas turbine engine and thereby diverts foreign objects in the air from ingestion in the engine.

Other objects and many of the attendant advantages of this invention will be readily appreciated as the same becomes better understood by reference to the following detailed description when considered in connection with the accompanying drawing wherein:

FIG. 1 is a perspective view of a preferred embodiment of the present invention with parts broken away to illustrate the interior construction of the engine;

FIG. 2 is a frontal view of the embodiment of the invention shown in FIG. 1; and FIG. 3 is a perspective view with parts broken away of another preferred embodiment of the present invention.

Referring now to the drawing, the axial flow turbojet engine 3 includes the compresor 5, the combustion unit 7 and the turbine 9. The engine 3 is not shown in detail in the drawing since its detailed structure is not material to the invention and since the invention may be employed with compressors, combustion units and turbines of various types. For a complete understanding of the invention, it need only be understood that air enters the air intake end of the compressor 5 and after being compressed is supplied to the combustion unit 7. Motive fluid from the combustion unit 7 then drives the turbine and the jet discharge from the engine exhaust nozzle provides the required forward thrust for the aircraft.

The rotor of the compressor 5 is mechanically coupled to the turbine 9 preferably by means of the shaft 11 which is suitably journaled in the engine 3 by bearings not shown in the drawing. The fairing dome or the like 13 is secured to the stator structure of the compressor 5 and preferably remains fixed with respect to its stator on an extended longitudinal axis of the compressor. The debris rotor 15 is preferably rotatably mounted on the fairing dome 13 and is mechanically coupled to the compressor rotor 5 in any suitable conventional manner. The debris rotor 15 includes a central core 17 which is preferably flared outwardly between its upstream extremity and its downstream extremity adjacent the compressor 5. The helical-shaped vanes (only one shown) 19 which extends outwardly from the core 17 imparts a centrifugal field of flow to the air as it passes into the compressor 5 in a manner which will be more apparent hereinafter. The outer casing or the like 21 is mounted concentrically about the fairing dome 13 and the stator structure of the compressor 5 preferably by means of the support vanes or struts 23 and 25 which extend outwardly radially from the dome 13 and the stator of the compressor 5 to the internal surface of the casing 21. In this way, an annular air inlet passage 27 for the compressor is formed between the dome 13 and the casing 21 and an annular engine bypass ejector duct 29 is formed between the outer peripheral surface of the stator of the compressor 5 and the casing 21.

In operation, when the aircraft is either in flight or under ground idling or taxiing conditions, air is drawn into the compressor 5 of the engine through the annular air intake passage 27 at relatively high speed. Rotation of the debris rotor 15 with its helical vanes 19 at a predetermined high angular velocity produces a centrifugal field of flow in the air as it flows toward the compressor 5 of the engine. Foreign matter such as dirt, sand, water, bolts, nuts and various debris mixed in the vortex of swirling air are therefore centrifuged toward the outer wall of the annular passage 27 and out through the engine bypass ejector duct 29 without ingestion or damage to the engine. The outwardly flared core 17 of the debris rotor 15 also aids in positively directing the foreign particles and debris outwardly toward the outer casing 21 and out through the bypass ejector duct 29 rather than through the interior of the engine 3. Uncontaminated air in suitable amount for proper operation of the engine 3 passes through the compressor 5 and the combustion unit 7 for discharge from the exhaust nozzle of the engine in the usual manner. In fact, it has been found that performance of the basic engine is improved when it is modified in the manner indicated hereinabove since the engine is converted to a turbofan engine configuration with resulting increased thrust and decreased fuel consumption. Safety, durability, reliability and economy in the operation of the engine are therefore enhanced.

Another embodiment of the invention is illustrated in FIG. 3 of the drawing. As shown therein, the fairing dome 31 is secured to the stator structure of the compressor 33 and remains fixed with respect to its stator on an extended longitudinal axis of the compressor. The helical-shaped vane 35 is fixedly secured to the fairing dome 31 and directs the incoming air in the annular passage 37 between the casing 39 and the dome 31 in a centrifugal field of flow. The annular debris collection chamber 41 is formed by the casing structure around the leading extremity of the outer peripheral surface of the stator structure of the compressor 33. The trap door or the like 43 provides a convenient means for discharge of accumulated debris within the chamber 45.

Obviously, many modifications and variations of the present invention are possible in the light of the above teachings. It is therefore to be understood that within

What is claimed is:
1. In a gas turbine engine including a compressor, a combustion unit, a turbine, and means for transmitting rotary power of the turbine of the compressor, apparatus for preventing entry of foreign objects into the engine, said apparatus comprising:
 (a) a fairing dome which is secured to the compressor and extends upstream from the compressor along an extended longitudinal axis thereof;
 (b) a casing which is concentrically mounted about the compressor and the dome, an annular air inlet passage for the compressor being formed between the casing and the dome and an annular engine bypass ejector duct being formed between the casing and the outer peripheral surface of the stator structure of the compressor;
 (c) and a helical-shaped vane rotatably mounted on the dome so as to impart a centrifugal field of flow to air as it passes through the annular inlet passage into the compressor.

2. In gas turbine engine including a compressor, a combustion unit, a turbine, and means for transmitting rotary power of the turbine to the compressor, apparatus for preventing entry of foreign objects into the engine, said apparatus comprising:
 (a) a fairing dome which is secured to the compressor and extends upstream from the compressor along an extended longitudinal axis thereof;
 (b) a casing which is concentrically mounted about the compressor and the dome, an annular air inlet passage for the compressor being formed between the casing and the dome and an annular bypass ejector duct being formed between the casing and the outer peripheral surface of the stator structure of the compressor;
 (c) a helical-shaped vane rotatably mounted on the dome so as to impart a centrifugal field of flow to air as it passes through the annular inlet passage into the compressor;
 (d) and means for rotating the helical-shaped vanes about the axis of the dome at a predetermined rate.

3. In a gas turbine engine including a compressor, a combustion unit, a turbine, and means for transmitting rotary power of the turbine to the compressor, apparatus for preventing entry of foreign objects into the engine, said apparatus comprising:
 (a) a fairing dome which is secured to the compressor and extends upstream from the compressor along an extended longitudinal axis thereof;
 (b) a casing which is concentrically mounted about the compressor and the dome, an annular air inlet passage for the compressor being formed between the casing and the dome and an annular engine bypass ejector duct being formed between the casing and the outer peripheral surface of the stator structure of the compressor;
 (c) and a helical-shaped vane rotatably with an integral central core which is mounted on the dome so as to impart a centrifugal field of flow to air as it passes through the annular inlet passage into the compressor, the outer peripheral surface of the core of the vane being flared outwardly between its upstream extremity and its downstream extremity adjacent the compressor.

4. In a gas turbine engine including a compressor, a combustion unit, a turbine, and means for transmitting rotary power of the turbine to the compressor, apparatus for preventing entry of foreign objects into the engine, said apparatus comprising:
 (a) a fairing dome which is secured to the compressor and extends upstream from the compressor along an extended longitudinal axis thereof;
 (b) a casing which is concentrically mounted about the compressor and the dome, an annular air inlet passage for the compressor being formed between the casing and the dome and an annular engine bypass ejector duct being formed between the casing and the outer peripheral surface of the stator structure of the compressor;
 (c) a helical-shaped vane with an integral central core which is rotatably mounted on the dome so as to impart a centrifugal field of flow to air as it passes through the annular inlet passage into the compressor, the outer peripheral surface of the core of the vane being flared outwardly between its upstream extremity and its downstream extremity adjacent the compressor;
 (d) and means for rotating the helical-shaped vanes about the axis of the dome at a predetermined rate.

5. In a gas turbine engine including a compressor, a combustion unit, a turbine, and means for transmitting rotary power of the turbine to the compressor, apparatus for preventing entry of foreign objects into the engine, said apparatus comprising:
 (a) a fairing dome which is secured to the compresor and extends upstream from the compressor along an extended longitudinal axis thereof;
 (b) a casing which is concentrically mounted about the compressor and the dome, an annular air inlet passage for the compressor being formed between the casing and the dome and an annular engine bypass ejector duct being formed between the casing and the outer peripheral surface of the stator structure of the compressor;
 (c) strut means which extend outwardly radially from the dome to the inner surface of the casing;
 (d) and a helical-shaped vane rotatably mounted on the dome so as to impart a centrifugal field of flow to air as it passes through the annular inlet passage into the compressor.

6. In a gas turbine engine including a compressor, a combustion unit, a turbine, and means for transmitting rotary power of the turbine to the compressor, apparatus for preventing entry of foreign objects into the engine, said apparatus comprising:
 (a) a fairing dome which is secured to the compressor and extends upstream from the compressor along an extended longitudinal axis thereof;
 (b) a casing structure which is concentrically mounted about the compressor and the dome, an annular air inlet passage for the compressor being formed between the casing structure and the dome and an annular debris collection chamber being formed between the casing structure and the outer peripheral surface of the stator structure of the compressor;
 (c) means for removing debris from the debris collection chamber;
 (d) and a helical-shaped vane rotatably mounted on the dome so as to impart a centrifugal field of flow to air as it passes through the annular inlet passage into the compressor.

References Cited by the Examiner
UNITED STATES PATENTS

| | | | |
|---|---|---|---|
| 2,944,731 | 7/1960 | Kastan | 60—39.09 X |
| 2,976,952 | 3/1961 | Holland | 244—53.8 X |
| 3,098,632 | 7/1963 | Christenson. | |

FOREIGN PATENTS 663,194  12/1951  Great Britain.

CARLTON R. CROYLE, *Primary Examiner.*